United States Patent [19]

LeVan

[11] Patent Number: 6,104,488
[45] Date of Patent: Aug. 15, 2000

[54] MULTI-OCTAVE SPECTROSCOPY WITH MULTI-WAVEBAND INFRARED FOCAL PLANE ARRAY

[75] Inventor: Paul D. LeVan, Albuquerque, N. Mex.

[73] Assignee: The United States of America as represented by the Secretary of the Air Force, Washington, D.C.

[21] Appl. No.: 09/372,725

[22] Filed: Aug. 12, 1999

[51] Int. Cl.[7] .................................................. G01J 3/18
[52] U.S. Cl. ...................................... 356/328; 250/339.07
[58] Field of Search .................................. 356/326, 328; 250/339.02, 339.05, 339.07

[56] References Cited

U.S. PATENT DOCUMENTS 5,760,899  6/1998  Eismann ................................ 356/326

OTHER PUBLICATIONS

Reine et al., "Independently accessed back-to-back HgCdTe Photodiodes: A new dual-band IR detector," Journal of Electronic Materials, vol. 24, No. 5, 1995.

*Primary Examiner*—F. L. Evans
*Attorney, Agent, or Firm*—Kenneth E. Callahan

[57] ABSTRACT

Spectra corresponding to overlapping grating orders are focused onto a multi-waveband focal plane array in order to create spectral images of a scene simultaneously in multiple wavelength regions. The blaze of the grating is chosen so that all spectral orders are dispersed with high grating efficiency. Such an approach extends the spectral range of disperse spectrometers to several octaves of wavelength, while preserving the compact packaging and cryogenic requirements of conventional (one octave) instruments.

4 Claims, 4 Drawing Sheets

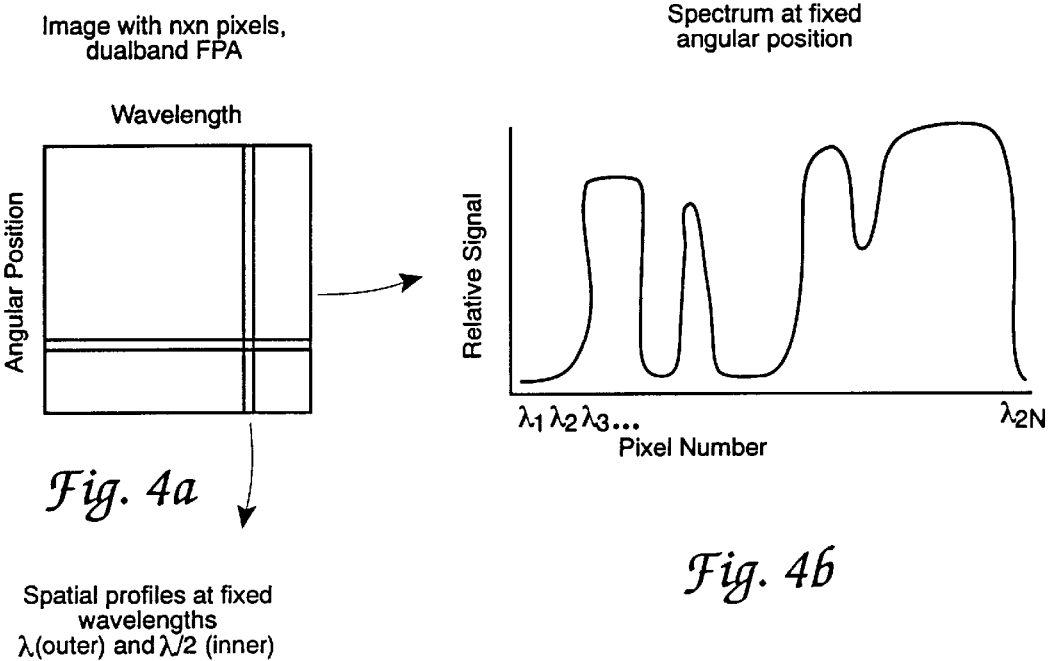
Image with nxn pixels, dualband FPA
Fig. 4a
Spatial profiles at fixed wavelengths
λ(outer) and λ/2 (inner)
Spectrum at fixed angular position
Fig. 4b
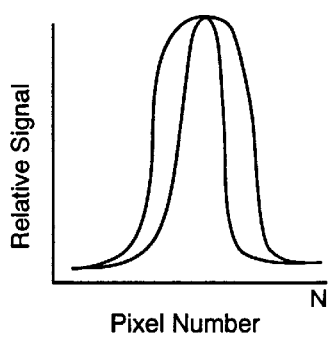
Fig. 4c

MULTI-OCTAVE SPECTROSCOPY WITH MULTI-WAVEBAND INFRARED FOCAL PLANE ARRAY

STATEMENT OF GOVERNMENT INTEREST

The conditions under which this invention was made are such as to entitle the Government of the United States under paragraph l(a) of Executive Order 10096, as represented by the Secretary of the Air Force, to the entire right, title and interest therein, including foreign rights.

BACKGROUND OF THE INVENTION

1. Field of the Invention

This invention relates generally to imaging spectrometers and, more particularly, to a dispersive spectrometer design combined with a dualband focal plane array that extends the range of wavelengths that can be efficiently sampled for hyperspectral imaging applications.

2. Description of the Prior Art

Infrared grating spectrometers employ a grating to disperse infrared wavelengths over one or more columns of pixels to achieve separation of the wavelength elements. Because grating efficiency (the ratio of dispersed to incident radiation, within a small wavelength interval) is high over only an approximate "octave" range of wavelengths near the "blaze" wavelength (e.g., from 7 to 14 microns for an 11 micron blaze), multi-octave spectroscopy has previously required multiple grating, camera mirror, and focal plane array (FPA) "channels." Wavelength separation for the channels is achieved with optical beamsplitters (referred to as the "traditional approach" hereafter). Since higher performance, long wave infrared (LWIR) spectroscopic applications benefit from cryogenically-cooled FPAs and fore-optics, penalties associated with this traditional approach are large. For space applications in particular, the "heat lift" requirement of the space cryocooler needs to be carefully restricted, and is negatively impacted by the higher cooling requirements of the traditional approach.

Dispersive spectrometers using a prism as the dispersion element also suffer from different degradations in efficiency with wavelength, including loss of transmittance in anti-reflective coating and deviation from optimal values of angular dispersion. These limitations also limit prism spectrometers to slightly over one octave in non-degraded performance. A dual-channel grating spectrometer following the "traditional approach" is shown in FIG. 1. The fore-optics 104 collect the incident light and focus the beam at the field stop where a spectrometer slit is located. The collimator 105 forms a collimated optical beam for incidence on the beamsplitter 106 and then onto the dispersion elements 107, either a prism (shown) or a grating. The optical beamsplitter 106 can be either a wavelength or non-wavelength selective type. If wavelength selective, a dichroic reflects shorter and transmits longer infrared wavebands at near unity efficiencies. In a non-wavelength selective beamsplitter, a partially silvered mirror reflects and transmits equal amounts of the two wavebands. Two focal plane arrays 108, one for shorter and one for longer wavelengths, are required.

The invention described here achieves dual-octave (and multi-octave, as a logical extension) spectroscopy with high grating efficiency using a single dual- or multi-band FPA and grating element. The approach therefore results in compactness and simplifies the cooling requirements. Further, the traditional approach requires good alignment (both translational and rotational) among the various grating and FPA pairs for both ground and space applications. This requirement is particularly challenging to accomplish at cryogenic working temperatures.

Each of the approaches described above provide simultaneity in the collection of all wavelength elements, thereby "freezing" variations in target brightness, either intrinsic to the target, or those resulting from atmospheric or range variations. The resulting target spectrum, with wavelength elements collected simultaneously, is much less affected by these variations than are spectrometers that collect spectral data in a sequential mode.

SUMMARY OF THE INVENTION

The present invention is a compact and efficient, very broadband, grating spectrometer for hyperspectral imaging (HSI) applications. The design employs new-technology infrared focal plane arrays that image simultaneously in two wavebands (see, for example, Reine et al., "*Independently Accessed Back-to-Back HgCdTe Photodiodes: A New Dual-Band IR Detector*", Journal of Electronic Materials, Vol. 24, No. 5, 1995). These "dualband" focal plane arrays were originally conceived for multi-waveband imaging applications. This invention employs a dualband focal plane array in a novel, dispersive spectrometer design that extends the range of wavelengths that can be efficiently sampled. This approach allows efficient operation over twice as many octaves in wavelength as a conventional grating spectrometer that employs a single waveband infrared focal plane array. It also allows two overlapping grating orders (spectra) to fall onto the dualband focal plane array. These orders are separated by the dualband capability of the focal plane array. The grating operates with comparable efficiency in both grating orders with grating efficiencies similar to that obtained for the "blaze wavelength." The result is a compact spectrometer with broad spectral range that has significant advantages for space operations through reduction in size and cooling requirements.

BRIEF DESCRIPTION OF THE DRAWINGS

FIGS. 4(a)–(c) show spectral image data collected with an N×N pixel dualband focal plane array.

DESCRIPTION OF THE PREFERRED EMBODIMENT

Figure 1:
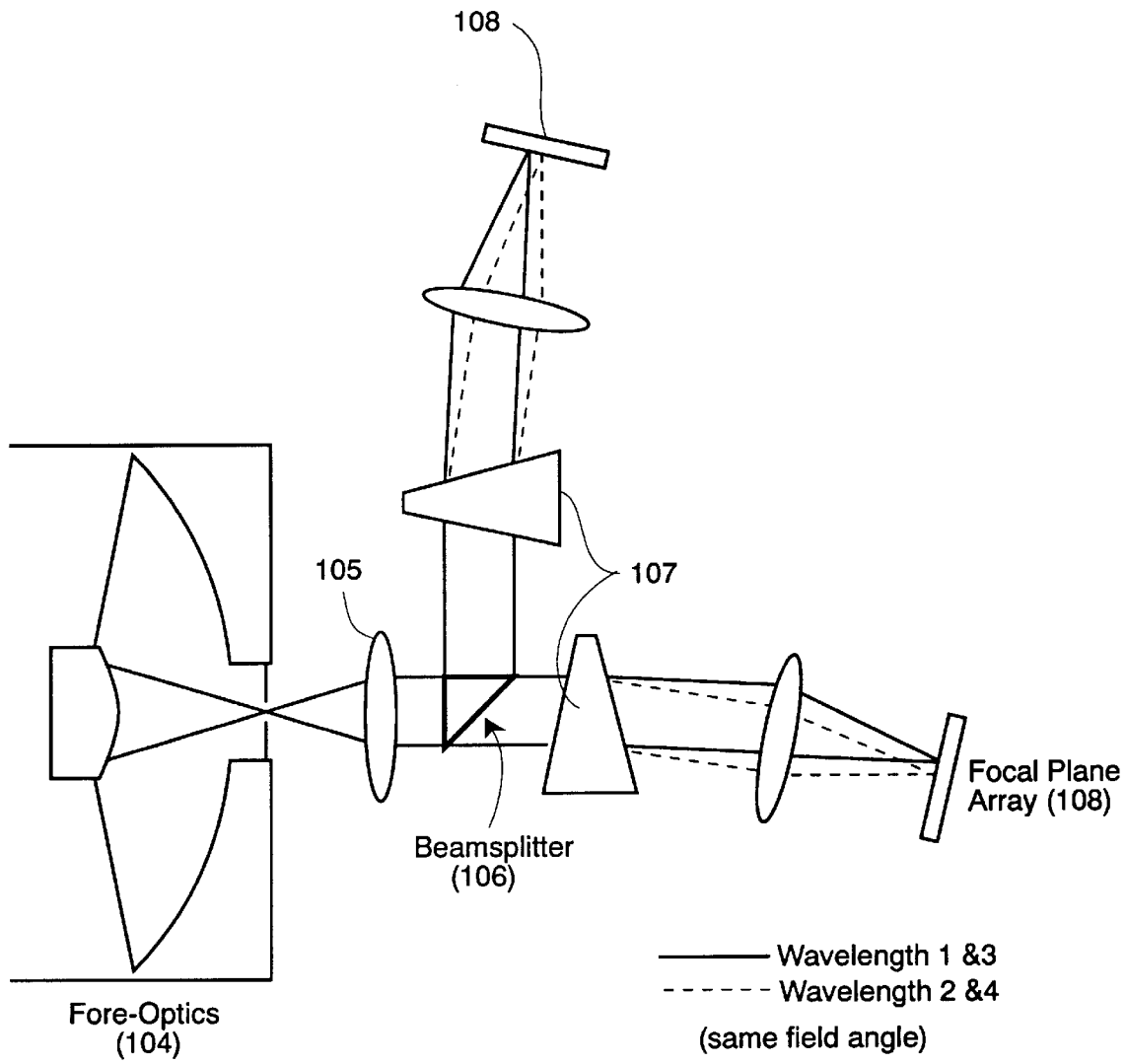
FIG. 1 shows the "traditional approach" for a dual-channel grating spectrometer.
Figure 2:
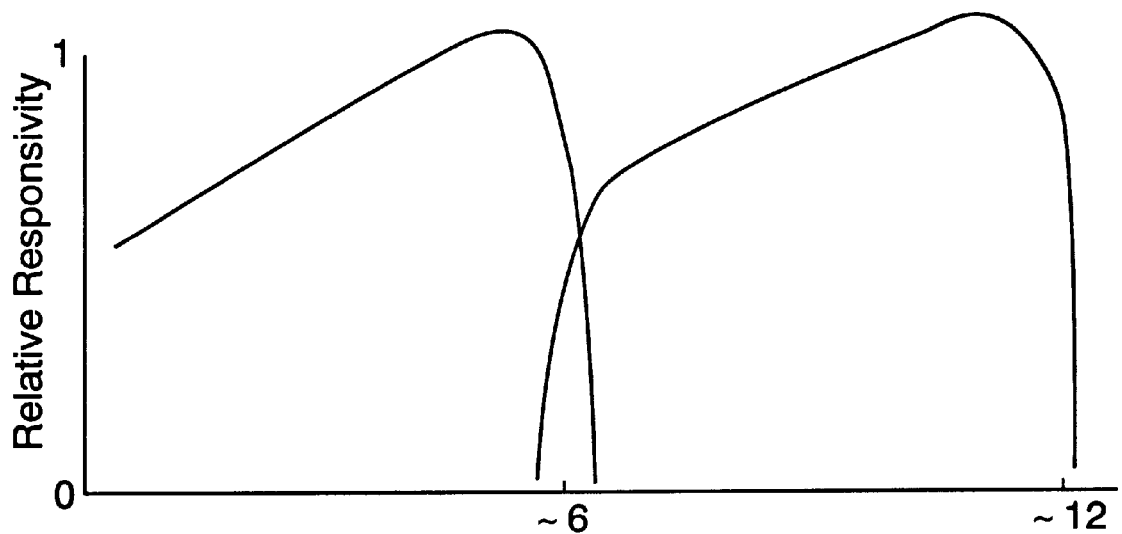
FIG. 2 illustrates the spectral response curves of an example dualband (MWIR & LWIR) FPA.

The dual-octave grating spectrometer of the present invention is based on the relatively new dualband FPA technology. An example of a dualband FPA based on the HgCdTe material system was developed by Raytheon Infrared Center of Excellence (Goleta, Calif.). The focal plane array images simultaneously in the medium wave infrared (MWIR) and LWIR on spatially-collocated centers having response curves with cut-off wavelengths near 5 and 10 microns. It achieves this capability through unique growth (via molecular beam epitaxy) of LWIR HgCdTe detector material on MWIR material. When operated in a "back-illuminated" configuration, the MWIR photodiodes appear "stacked" on top of the LWIR diodes from the perspective of incoming photons. The detector multiplexer is also of specific dualband design, with separate indium interconnect bumps, amplifier circuitry, and charge integration capacitance at each pixel site. The pixel format and pitch of the dualband FPA are 256×256 and 60 microns, respectively. FIG. 2 shows dualband FPA spectral response curves for a typical pixel. In this figure, the spectral cutoff wavelengths are approximately 6 and 12 microns. Each pixel on the N×N pixel FPA is a site for such dualband detection.

Figure 3:
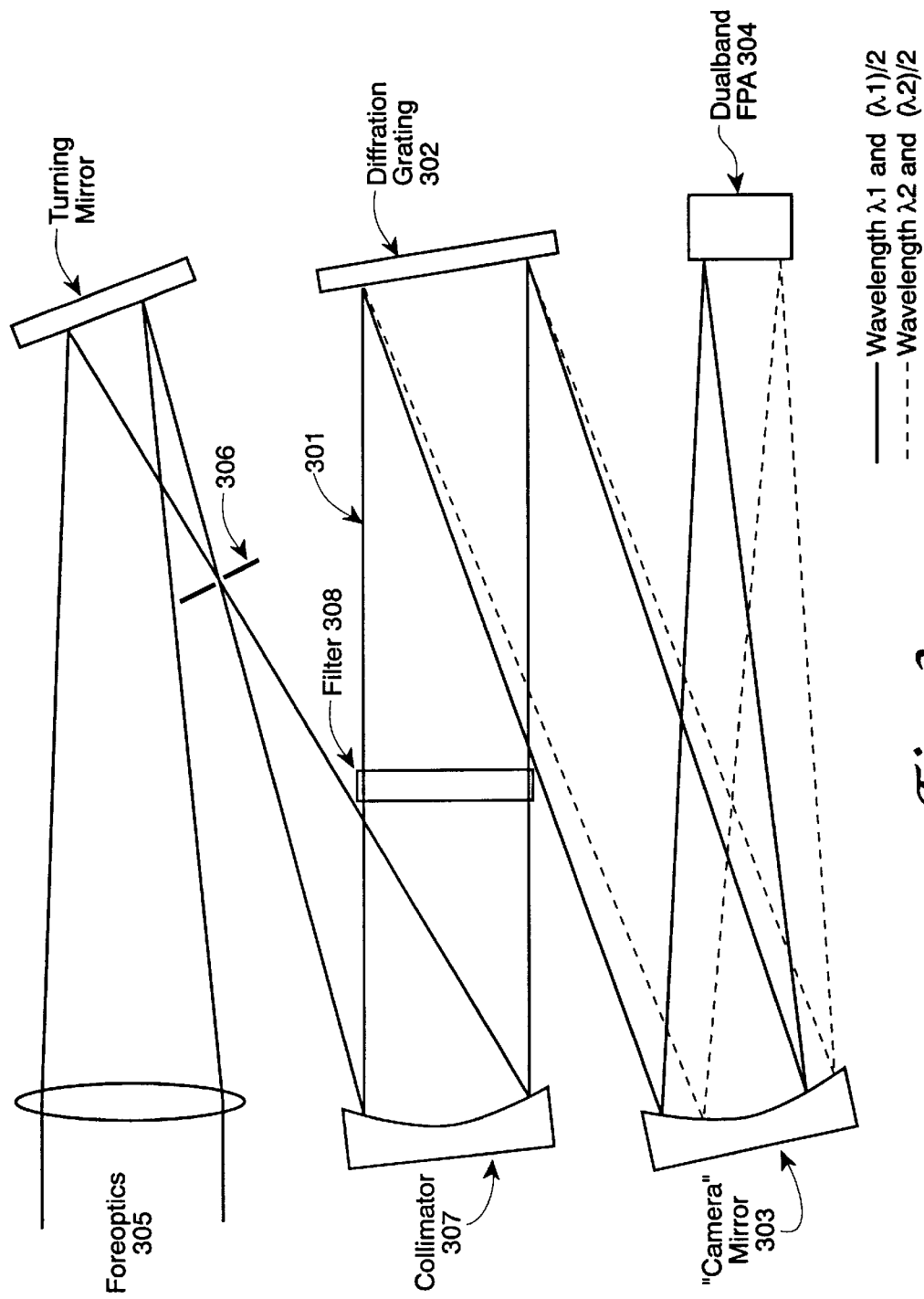
FIG. 3 illustrates the conceptual basis for the proposed invention.

The dual-octave grating spectrometer is based on the dualband FPA technology described above combined with a diffraction grating. Spectra from two overlapping grating orders of the diffraction grating are allowed to fall onto the FPA (see FIG. 3). Fore-optics 305 collect the incident light and focus the optical beam at a field stop where a spectrometer slit aperture 306 is located. A collimator 307 then forms a collimated optical beam 301 for incidence upon the diffraction grating 302. The collimated input beam 301 is reflected off a grating 302 for which two grating orders are allowed. A camera mirror 303 re-images the beam onto the dualband focal plane array 304. The dualband FPA is shown in a face view rather than its actual edge-on mounting. The lower order spectrum is dispersed by the grating 302 between two wavelengths, $\lambda_1$ and $\lambda_2$, across one dimension of the dualband FPA; the dispersed wavelengths correspond with the longer of the two wavebands of the FPA. The blaze of the grating is chosen such that the lower order spectrum falls within the "useable" range of grating efficiencies. Wavelengths between $\lambda_1/n$ and $\lambda_2/n$ (for n an integer greater than 1) are also allowed to disperse across the FPA. These dispersed wavelengths correspond with the shorter of the two wavebands of the dualband FPA. Similar values of grating efficiency can be expected for the higher order spectra, since there is a direct correspondence between the angles of incidence and diffraction between the two orders, and the blaze condition is satisfied for both $\lambda_{blaze}$ and $\lambda_{blaze}/n$. As would be the case for a conventional grating spectrometer, higher spectral orders that fall within the detector response curve are eliminated with long-pass or bandpass filters 308.

FIG. 4 shows the output of the dualband FPA. The spectral image represents data collected by an N×N pixel dualband FPA. One dimensional cuts through the image at two arbitrary locations are shown at one spectral and one angular position. The "x" coordinate of the FPA in FIG. 4(a) represents wavelength and the "y" coordinate is the angular position. FIG. 4(b) shows the output of relative signal strength vs. wavelength for a fixed angular position. FIG. 4(c) shows the relative signal strength vs. angular position for a fixed wavelength in each grating order.

Two obvious variations of the proposed invention follow. First, when infrared FPAs that image simultaneously in 3 and more wavebands become available, spectroscopy over the corresponding number of octaves becomes a straight-forward extension of the concept described above. For example, a three-band, photovoltaic FPA, with wavelength cutoffs near 4, 8, and 16 microns, could be the basis of a highly efficient, 3-octave spectrometer operating in the 2–4, 4–8, and 8 to 16 micron spectral regions. Secondly, a dual-octave application need not involve contiguous wavelength regions. For example, spectroscopy in the wavelength regions from 2 to 4 and 8 to 16 microns could be realized with a dualband FPA having its first wavelength cutoff between 4 and 8 microns, and its second cutoff beyond 16 microns. In this case (in accordance with the convention in the paragraph, above) "n" is greater than two, and the two spectral orders are non-contiguous. Such an embodiment of the proposed invention would likely need a spectral notch filter that blocks wavelengths from $\lambda_2/n$ to $\lambda_1$. Such notch filters can be obtained as custom products from commercial, infrared spectral filter manufacturers.

The proposed invention achieves a result similar in certain respects to a cross-dispersion grating spectrograph (CDGS). The CDGS also separates the spectra of contiguous, overlapping grating orders (which, as already mentioned, enjoy the same grating efficiency as the wavelengths near the grating blaze wavelength), but with a prism located "downstream" of the grating and oriented with its dispersion direction perpendicular to that of the grating. Advantages of the dualband FPA grating spectrometer over the CDGS include increased spatial coverage (since, for the CDGS approach, part of the spatial direction on the FPA is used for the higher grating orders), and that the spectra are dispersed along a single direction on the dualband FPA and do not exhibit the curvature that obtains for CDGS spectra.

I claim:

1. A grating spectrometer apparatus for simultaneously producing multiple spectral images of a scene on a multi-waveband focal plane array, typically used for imaging "m" wavebands simultaneously (m=1, 2, 3, . . . ), with the spectral images corresponding to multiple, overlapping grating orders, the apparatus comprising:

a. fore-optics (305) to collect incident light from a scene of interest and image it onto an intermediate slit aperture (306);

b. means to collimate the light (307) collected by said fore-optics for incidence upon a blazed diffraction grating (302), said blazed diffraction grating having a blaze wavelength chosen to fall near the center of the range of dispersed wavelengths;

c. means to re-image (303) said collimated light beam reflected from said blazed diffraction grating onto a multi-waveband focal plane array having m discrete wavebands (304);

d. a bandpass or long-pass filter (308) positioned between said collimator and said diffraction grating to eliminate spectral orders greater than the m-th order that fall within the detector response curve.

2. A grating spectrometer apparatus for simultaneously producing first and second spectral images of a scene on a dual-waveband focal plane array, the spectral images corresponding to two overlapping grating orders, said apparatus comprising:

a. fore-optics to collect the incident light from a scene of interest and image it onto an intermediate slit aperture;

b. means to collimate the light collected by said fore-optics for incidence upon a blazed diffraction grating, said blazed diffraction grating having a blaze wavelength chosen to fall near the center of the range of dispersed wavelengths;

c. means to re-image said collimated light beam reflected from said blazed diffraction grating onto a dual-waveband focal plane array; and d. a bandpass or long-pass filter means positioned between said collimator and said diffraction grating to eliminate spectral orders greater than the second order that fall within the detector response curve.

3. The spectral imaging apparatus as in claim 2, in which the first grating order spectrum is in the long wavelength infrared spectral region and the second grating order spectrum falls within the mid wave infrared spectral region.

4. The spectral imaging apparatus as in claim 3, in which the first grating order spectrum spans the wavelength range from approximately 7 to 11 microns, and the second grating order spectrum spans the region from approximately 3.5 to 5.5 microns, thereby exploiting the atmospheric transmission regions for a down-looking, space-based sensor.

* * * * *